(12) United States Patent
Rabin et al.

(10) Patent No.: US 11,907,394 B1
(45) Date of Patent: Feb. 20, 2024

(54) ISOLATION AND AUTHORIZATION FOR SEGREGATED COMMAND AND QUERY DATABASE RESOURCE ACCESS

(71) Applicant: CyberArk Software Ltd., Petach-Tikva (IL)

(72) Inventors: Niv Rabin, Petach-Tikva (IL); Michael Balber, Petach-Tikva (IL); Eli Shemesh, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 18/080,273

(22) Filed: Dec. 13, 2022

(51) Int. Cl.
*G06F 21/62* (2013.01)
*G06F 21/60* (2013.01)
*G06F 21/31* (2013.01)

(52) U.S. Cl.
CPC .......... *G06F 21/6227* (2013.01); *G06F 21/31* (2013.01); *G06F 21/604* (2013.01)

(58) Field of Classification Search
CPC ..... G06F 21/6227; G06F 21/31; G06F 21/604
See application file for complete search history.

(56) References Cited

U.S. PATENT DOCUMENTS

| | | | |
|---|---|---|---|
| 9,002,810 B1* | 4/2015 | Van Rotterdam ... | G06F 16/2474 707/695 |
| 10,341,172 B1* | 7/2019 | Vanden Berg .... | G06F 16/24542 |
| 10,382,401 B1* | 8/2019 | Lee ........................ | H04L 63/166 |
| 11,586,437 B1* | 2/2023 | Tripp ........................ | G06F 8/75 |
| 11,595,363 B2* | 2/2023 | Biswal ...................... | H04L 9/14 |
| 2014/0032758 A1* | 1/2014 | Barton .................... | H04L 41/00 709/225 |
| 2018/0007059 A1* | 1/2018 | Innes ................... | G06F 21/6218 |
| 2021/0336966 A1* | 10/2021 | Gujarathi .............. | H04L 9/3213 |

* cited by examiner

*Primary Examiner* — Kambiz Zand
(74) *Attorney, Agent, or Firm* — Finnegan, Henderson, Farabow, Garrett & Dunner, LLP.

(57) ABSTRACT

Disclosed embodiments relate to systems and methods for securely performing actions on a resource. Techniques include receiving a request by the entity to perform a privileged action on a resource, the request including a token associated with the entity; providing a first indication of the request to a first handler; providing a second indication of the request to a second handler configured to perform the privileged action on the resource, wherein when the privileged action includes a query, the second indication of the request is provided to a query handler, and when the privileged action includes a write command, the second indication of the request is provided to a command handler.

30 Claims, 6 Drawing Sheets

ISOLATION AND AUTHORIZATION FOR SEGREGATED COMMAND AND QUERY DATABASE RESOURCE ACCESS

BACKGROUND

Technical Field

The present disclosure relates generally to cybersecurity and, more specifically, to techniques for secure command and query database access.

Background Information

In modern network-based environments, it is increasingly important for organizations and individuals alike to securely control which users and processes are authorized to perform sensitive operations. This may be especially important in cloud computing platforms or other applications in which multiple tenants or users may access secure data through the same platform. In these architectures, authentication of organizations and individuals, and isolation from other organizations and individuals, may be critical.

It is often difficult, however, to incorporate this form of multi-tenant architecture with other forms of architectures. For example, some database architectures may include segregated models for queries and commands for a particular database. These segregated architectures, however, do not allow for the authentication and isolation of tenants. Thus, it may be difficult or impossible to maintain a segregated query and command pattern for a database, while scaling this pattern to multiple tenants and multiple databases. For example, the sheer volume of connections that would be required to implement separate databases for each tenant, with each having dedicated read and command modules, would be prohibitive.

Accordingly, in view of these and other deficiencies in existing techniques, technological solutions are needed for efficiently and securely authenticating and isolating tenants in a segregated read and write database architecture. For example, solutions should advantageously include single query and command handlers able to connect to multiple databases. Further, these query and command handlers should allow individual tenants to be authenticated in a secure manner to isolate tenants within the platform.

SUMMARY

The disclosed embodiments describe non-transitory computer readable media, systems, and methods for securely performing actions on a resource. For example, in an embodiment, a non-transitory computer readable medium may include instructions that, when executed by at least one processor, cause the at least one processor to perform operations comprising receiving, from an entity associated with an organization, a request by the entity to perform a privileged action on a resource associated with the organization, the privileged action including either a query or write command, the request including a token associated with the entity; providing a first indication of the request to a first handler configured to impersonate the organization, wherein the first handler is further configured to interact with a second handler; and providing a second indication of the request to the second handler, the second handler being configured to perform the privileged action on the resource, the second handler including a query handler and a command handler, wherein: when the privileged action includes a query, the second indication of the request is provided to the query handler and the query handler is configured to provide an indication of a result of the privileged action; and when the privileged action includes a write command, the second indication of the request is provided to the command handler.

According to a disclosed embodiment, the operations may further comprise validating the token, and wherein the first indication of the request is provided to the first handler based on the validation.

According to a disclosed embodiment, the first indication of the request may include an indication of the privileged action and the token.

According to a disclosed embodiment, the first handler may be configured to impersonate the organization using the token.

According to a disclosed embodiment, the second indication of the request may include the token and wherein performing the privileged action by the second handler includes validating the token.

According to a disclosed embodiment, impersonating the organization may enable the interaction between the first handler and the second handler.

According to a disclosed embodiment, impersonating the organization may include associating the first handler with a policy enabling the interaction with the second handler.

According to a disclosed embodiment, the second handler may be associated with a policy controlling the interaction with the first handler.

According to a disclosed embodiment, providing the second indication of the request to the second handler may include generating a payload.

According to a disclosed embodiment, the payload may include an indication of the privileged action.

According to a disclosed embodiment, the organization may be a tenant in a cloud computing platform.

According to a disclosed embodiment, the first query handler and the second query handler may be virtual computing services in a cloud computing platform.

According to a disclosed embodiment, the second handler may be configured to perform the privileged action on the resource using at least one operations handler.

According to a disclosed embodiment, the at least one operations handler may be selected from a plurality of operations handlers based on the privileged action.

According to a disclosed embodiment, providing the second indication of the request to the second handler may include selecting the operations handler from a plurality of operations handlers, each of the operations handlers being associated with a different second handler.

According to a disclosed embodiment, when the privileged action includes a write command, providing the second indication of the request to the second handler may include adding a message to a broker service.

According to a disclosed embodiment, the first handler may be authorized to add the message to the broker service based on impersonating the organization.

According to a disclosed embodiment, performing the privileged action by the second handler may include consuming the message from the broker service.

According to a disclosed embodiment, the second handler may be authorized to consume messages from the broker service, and an additional second handler not associated with the organization may be unauthorized to consume messages from the broker service.

According to another disclosed embodiment, there may be a computer-implemented method for securely performing actions on a resource. The method may comprise receiving, from an entity associated with an organization, a request by the entity to perform a privileged action on a resource associated with the organization, the privileged action including either a query or a write command, the request including a token associated with the entity; providing a first indication of the request to a first handler configured to impersonate the organization, wherein the first handler is further configured to interact with a second handler associated with the resource; and providing a second indication of the request to the second handler, the second handler being configured to perform the privileged action on the resource, the second handler including a query handler and a command handler, wherein: when the privileged action includes a query, the second indication of the request is provided to the query handler and the query handler is configured to provide an indication of a result of the privileged action; and when the privileged action includes a write command, the second indication of the request is provided to the command handler.

According to a disclosed embodiment, providing the second indication of the request to the second handler may include generating a payload including an indication of the privileged action operation and encrypting the payload using a public key of the entity associated with organization.

According to a disclosed embodiment, the public key may be available to the first handler only after impersonating the organization.

According to a disclosed embodiment, the second handler may be configured to decrypt the payload using a private key of the entity associated with the organization.

According to a disclosed embodiment, the private key may be available to the second handler only after validating the token.

According to a disclosed embodiment, the second indication of the request may include the token and the second handler may be configured to retrieve the private key of the entity associated with organization using an entity ID associated with the organization, the entity ID being extracted from the token.

According to a disclosed embodiment, the request may include an application programming interface (API) request.

According to a disclosed embodiment, the resource may be a database and the first handler may be a domain-specific handler and the second handler may be a database-specific handler.

According to a disclosed embodiment, when the privileged action includes a query, the indication of the result of the action may include data requested through the query.

According to a disclosed embodiment, when the privileged action includes a write command, the query handler is configured to provide a confirmation that information indicated by the write command has been written to the resource.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
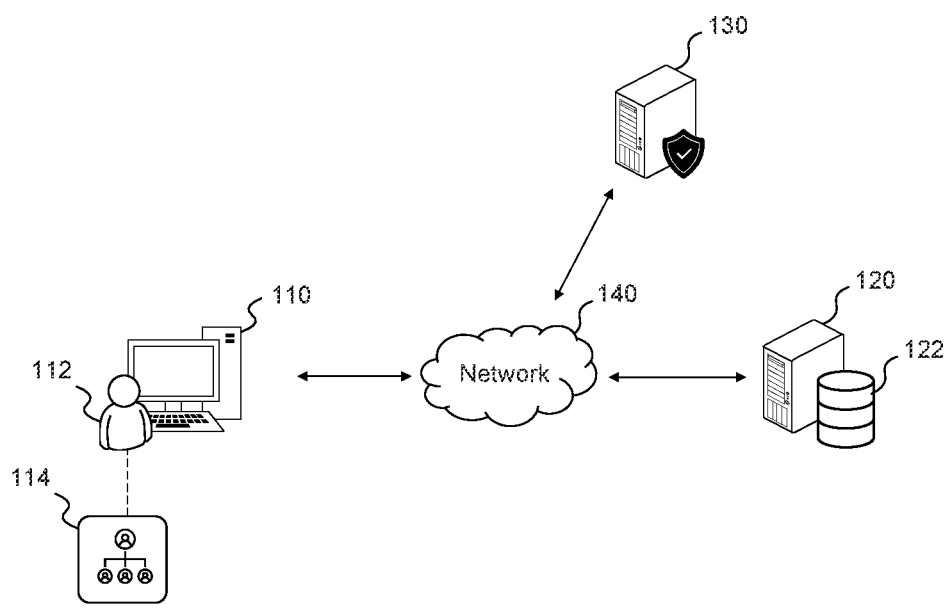
FIG. 1 illustrates an example system environment for securely performing actions on a resource, consistent with the disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques for securely performing actions on a resource described herein overcome several technological problems relating to security, efficiency, and performance in the fields of cybersecurity and network security. In particular, the disclosed embodiments provide techniques for isolating and authorizing tenants while maintaining the capabilities of segregated command and query architectures. For example, in traditional architectures, the same data model may be used to query and update a database. However, as the complexity of the database application increases, various issues may arise with the use of this singular data model. For example, data contention can occur when query and update operations are performed in parallel on the same set of data. Further, read and write workloads are often asymmetrical, with very different performance and scale requirements.

To address these issues, some architectures may implement separate data models for read and write commands. For example, a first model may address commands to update data and a second model may handle queries to read data. One example of such architecture is the Command and Query Responsibility Segregation (CQRS) pattern. This type of segregated pattern, however, presents its own difficulties. For example, these patterns are designed for use of a single database. Accordingly, they are not well-equipped to be implemented in cloud computing platforms having multiple databases. These segregated patterns also have no authentication or authorization requirements and thus do not allow for isolation of tenants in a multi-tenant architecture. Accordingly, it may be difficult or impossible using existing techniques to implement a multi-tenant platform in a secure manner while taking advantage of a segregated read and write pattern.

To address these and other issues, the disclosed embodiments provide for a segregated read and write architecture while providing isolation and improved security between tenants. For example, a cloud computing platform may be implemented with multiple tenants, each being associated with their own database. To provide segregated handling of read and write commands, separate query and command handlers may be used. These query and command handlers may have access to all tenant databases. However, to provide tenant isolation, these query and command handlers may be authorized to access a database of a particular tenant on an as-needed basis (e.g., associated with a particular request). Further, an additional handler may be implemented that is configured to impersonate (e.g., assume a role of) a particular tenant and invoke these query and command handlers. Accordingly, the disclosed embodiments allow for a segregated command and query architecture, while maintaining the integrity of authentication and isolation of tenants within a multi-tenant architecture.

Reference will now be made in detail to the disclosed embodiments, examples of which are illustrated in the accompanying drawings.

FIG. 1 illustrates an example system environment 100 for securely performing actions on a resource, consistent with the disclosed embodiments. System environment 100 may include one or more computing devices 110, one or more target resources 120, and one or more security servers 130, as shown in FIG. 1. System environment 100 may represent a system or network environment in which various privileged computing operations may be performed. As used herein, a privileged computing operation may refer to any operation requiring the entity performing the operation to have or be associated with at least one security privilege to perform the operation. For example, computing device 110 (or an entity associated with computing device 110, such as identity 112) may request to perform a privileged computing operation within system environment 100. In some embodiments, this may include a network-based privileged computing operation. For example, this may include an operation involving a file or other data on target resource 120 (which may include files stored in or associated with a database 122). While system environment 100 is shown in FIG. 1 to include target resource 120 and security server 130 separately from computing device 110 by way of example, in some embodiments, one or more of target resource 120, security server 130, and computing device 110 may be integrated with one another. For example, target resource 120 may be a local resource of computing device 110 or security server 130 may be an agent or other process running on computing device 110. Accordingly, system 100 may not necessarily be a network-based system environment and some or all aspects may be in a local environment.

The various components of system environment 100 may communicate over a network 140. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While system environment 100 is shown as a network-based environment, it is understood that in some embodiments, one or more aspects of the disclosed systems and methods may also be used in a localized system, with one or more of the components communicating directly with each other.

As noted above, system environment 100 may include one or more computing devices 110. Computing device 110 may include any device that may be used for performing a privileged computing operation. Accordingly, computing device 110 may include various forms of computer-based devices, such as a workstation or personal computer (e.g., a desktop or laptop computer), a mobile device (e.g., a mobile phone or tablet), a wearable device (e.g., a smart watch, smart jewelry, implantable device, fitness tracker, smart clothing, head-mounted display, etc.), an IoT device (e.g., smart home devices, industrial devices, etc.), or any other device that may be capable of performing a privileged computing operation. In some embodiments, computing device 110 may be a virtual machine (e.g., based on AWS™, Azure™ IBM Cloud™ etc.), container instance (e.g., Docker™ container, Java™ container, Windows Server™ container, etc.), or other virtualized instance.

In some embodiments, computing device 110 may be associated with an identity 112. Identity 112 may be any entity that may be associated with one or more privileges to be asserted to perform a privileged computing operation. For example, identity 112 may be a user, an account, an application, a process, a service, an electronic signature, a credential, a token, or any other entity or attribute associated with one or more components of system environment 100. In some embodiments, identity 112 may be a user requesting to perform a privileged computing operation through computing device 110. As noted above, this may be a privileged computing operation associated with data on computing device 110, target resource 120, and/or privilege management server 130.

In some embodiments, identity 112 may be associated with an organization 114. As used herein, an organization may refer to any form of entity through which identity 112 may be authorized to perform a privileged action. For example, organization 114 may be an organization (e.g., a company or other organization) that identity 112 belongs to, a group within an organization, or the like. Organization 114 may, at least partially, define a set of privileges associated with identity 112 and other members of the organization. In some embodiments, organization 114 may be a tenant associated with identity 112. For example, system 100 may be a multi-tenant architecture (e.g., a cloud computing platform) in which server 120 serves multiple tenants. In some embodiments, each tenant may be associated with one or more databases (e.g., database 122) or other resources. The disclosed embodiments may therefore be implemented to enforce tenant isolation for accessing target resource 120 within a multi-tenant architecture.

Target resource 120 may include any form of computing resource, such as a local or remote file system, local or remote machine memory, or any remote computing device that may be the target of a privileged computing operation or privileged computing operation request. Examples of network resource 120 may include SQL servers, databases or data structures holding confidential information, restricted-use applications, operating system directory services, access-restricted cloud-computing resources (e.g., an AWS™ or Azure™ server), sensitive IoT equipment (e.g., physical access control devices, video surveillance equipment, etc.), and/or any other computer-based equipment or software that may be accessible over a network. Target resource 120 may include various other forms of computing devices, such as a mobile device (e.g., a mobile phone or tablet), a wearable device (a smart watch, smart jewelry, implantable device, fitness tracker, smart clothing, or head-mounted display, etc.), an IoT device (e.g., a network-connected appliance, vehicle, lighting, thermostat, room access controller, building entry controller, parking garage controller, sensor device, etc.), a gateway, switch, router, portable device, virtual machine, or any other device that may be subject to privileged computing operations. In some embodiments, target resource 120 may be a privileged resource, such that access to the network resource 120 may be limited or restricted. For example, access to the target resource 120 may require a privileged credential (e.g., a password, a username, an SSH key, an asymmetric key, a security or access token, etc.).

In some embodiments, target resource 120 may include a database 122, as shown in FIG. 1. Database 122 may be configured to store privileged data that may be accessed by identity 112 using computing device 110. In some embodiments, database 122 may be associated with a particular organization (e.g., organization 114). For example, as described above, system 100 may be a multi-tenant system and database 122 may be associated with a particular tenant. While database 122 is shown by way of example, system 100 may include multiple databases 122 (and/or target resources 120). In some embodiments, each database 122 may be associated with a different organization. Accordingly, access to database 122 may be managed based on whether identity 112 is associated with a proper organization. While a database is provided by way of example, one skilled in the art would recognize that the embodiments disclosed herein may equally apply to various other types of resources.

Privilege management server 130 may be configured to monitor and/or manage one or more privileges within system environment 100. For example, privilege management server 130 may manage one or more privileges associated with identity 112 (or computing device 110) required to perform privileged actions within system environment 100. In some embodiments, privilege management server 130 may represent a privileged access management (PAM) system or other access management system implemented within system environment 100. Alternatively or additionally, privilege management server 130 may be a security information and event management (SIEM) resource implemented within system environment 100. Privilege management server 130 may be configured to grant, track, monitor, store, revoke, validate, or otherwise manage privileges of various identities within system environment 100. While illustrated as a separate component of system environment 100, it is to be understood that privilege management server 130 may be integrated with one or more other components of system environment 100. For example, in some embodiments, privilege management server 130 may be implemented as part of target network resource 120, computing device 110, or another device of system environment 100.

Figure 2A:
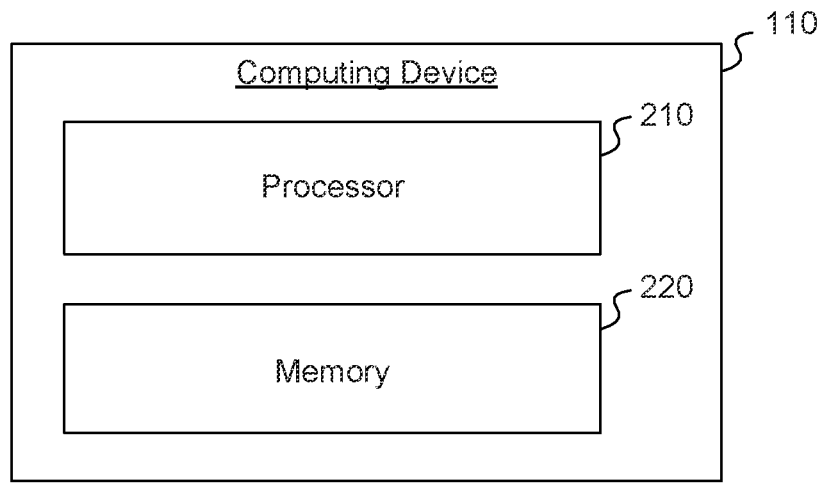
FIG. 2A is a block diagram showing an example computing device, consistent with the disclosed embodiments.

FIG. 2A is a block diagram showing an example computing device 110, consistent with the disclosed embodiments. As described above, computing device 110 may be a device configured to perform (or request to perform) one or more privileged computing operations and may include one or more dedicated processors and/or memories. For example, computing device 110 may include a processor (or multiple processors) 210, and a memory (or multiple memories) 220, as shown in FIG. 2A.

Processor 210 may take the form of, but is not limited to, a microprocessor, embedded processor, or the like, or may be integrated in a system on a chip (SoC). Furthermore, according to some embodiments, processor 210 may be from the family of processors manufactured by Intel®, AMD®, Qualcomm®, Apple®, NVIDIA®, or the like. Processor 210 may also be based on the ARM architecture, a mobile processor, or a graphics processing unit, etc. The disclosed embodiments are not limited to any particular type of processor configured in computing device 110.

Memory 220 may include one or more storage devices configured to store instructions used by the processor 210 to perform functions related to computing device 110 described herein. The disclosed embodiments are not limited to particular software programs or devices configured to perform dedicated tasks. For example, the memory 220 may store a single program, such as a user-level application, that performs the functions associated with the disclosed embodiments, or may comprise multiple software programs. Additionally, the processor 210 may, in some embodiments, execute one or more programs (or portions thereof) remotely located from computing device 110. Furthermore, memory 220 may include one or more storage devices configured to store data for use by the programs. Memory 220 may include, but is not limited to a hard drive, a solid state drive, a CD-ROM drive, a transient or temporary storage device (e.g., a random-access memory ("RAM")), a peripheral storage device (e.g., an external hard drive, a USB drive, etc.), a network drive, a cloud storage device, or any other storage device.

Figure 2B:
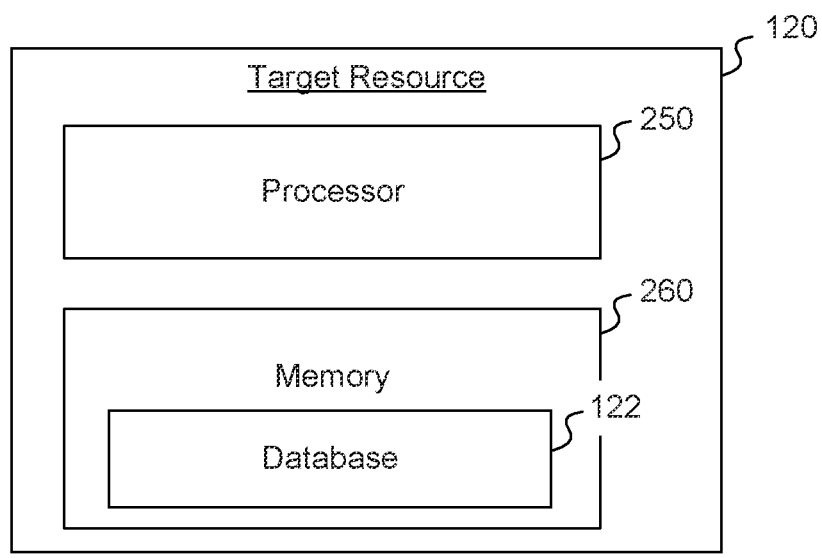
FIG. 2B is a block diagram showing an example target resource, consistent with the disclosed embodiments.

FIG. 2B is a block diagram showing an example target resource 120, consistent with the disclosed embodiments. As described above, target resource 120 may be a device configured to store privileged information. For example, target resource 120 may be a server or other form of network-based resource. Target resource 120 may include a processor (or multiple processors) 250, and a memory (or multiple memories) 260, as shown in FIG. 2.

Processor 250 may take the form of, but is not limited to, a microprocessor, embedded processor, or the like, or may be integrated in a system on a chip (SoC). Furthermore, according to some embodiments, processor 250 may be from the family of processors manufactured by Intel®, AMD®, Qualcomm®, Apple®, NVIDIA®, or the like. Processor 250 may also be based on the ARM architecture, a mobile processor, or a graphics processing unit, etc. The disclosed embodiments are not limited to any particular type of processor configured in target resource 120.

Memory 260 may include one or more storage devices configured to store instructions used by the processor 250 to perform functions related to target resource 120 described herein. The disclosed embodiments are not limited to particular software programs or devices configured to perform dedicated tasks. For example, the memory 260 may store a single program, such as a user-level application, that performs the functions associated with the disclosed embodiments, or may comprise multiple software programs. Additionally, the processor 250 may, in some embodiments, execute one or more programs (or portions thereof) remotely located from target resource 120. Furthermore, memory 260 may include one or more storage devices configured to store data for use by the programs. Memory 260 may include, but is not limited to, a hard drive, a solid state drive, a CD-ROM drive, a transient or temporary storage device (e.g., a random-access memory ("RAM")), a peripheral storage device (e.g., an external hard drive, a USB drive, etc.), a network drive, a cloud storage device, or any other storage device.

In some embodiments, memory 260 may include a database 122 as described above. Database 122 may be included on a volatile or non-volatile, magnetic, semiconductor, tape, optical, removable, non-removable, or other type of storage device or tangible or non-transitory computer-readable medium. Database 122 may also be part of target resource 120 or separate from target resource 120. When database 122 is not part of target resource 120, target resource 120 may exchange data with database 122 via a communication link. Database 122 may include one or more memory devices that store data and instructions used to perform one or more features of the disclosed embodiments. Database 122 may include any suitable databases, ranging from small databases hosted on a workstation to large databases distributed among data centers. Database 122 may also include any combination of one or more databases controlled by memory controller devices (e.g., server(s), etc.) or software. For example, database 122 may include document management systems, Microsoft SQL™ databases, SharePoint™ databases, Oracle™ databases, Sybase™ databases, other relational databases, or non-relational databases, such as mongo and others. While a single database 122 is shown for purposes of illustration, it is to be understood that memory 260 may include multiple databases.

In some embodiments, actions performed on database 122 (or other resources) may be segregated such that read operations and write operations are implemented separately (e.g., through separate models). As used herein, a read (or "query") action may refer to any operation to access or retrieve data from database 122. Accordingly, a result of a query may include returning data from database 122 specified by the query. A write command may refer to any operation to modify data within database 122. Accordingly, a result of a write command may include deleting data, adding data, altering data, moving data, or various other modifications to data within database 122. In some embodiments, write commands may be asynchronous. For example, the write command may be carried out without the need for providing a response, as described further below. In some embodiments, this segregated command and query database may be implemented through separate command and query models. In other words, a different model may be used to update information than a model used to read information. One example of a segregated architecture that may be implemented in system 100 is the Command and Query Responsibility Segregation (CQRS) pattern, however, various other patterns may be used.

As described above, this segregated architecture presents various problems when implemented in architectures with multiple organizations. The various embodiments described below overcome these and other deficiencies in existing architectures. For example, the disclosed embodiments may include a first handler that may receive various queries and write commands. The first handler may be configured to impersonate (or in some cases, assume a role of) an organization associated with a user and interact with a second handler to perform the requested action. The second handler may be specific to the type of action being performed, thus providing segregation of query and write commands. For example, when the privileged action includes a query, the second handler may be a query handler and when the privileged action includes a write command, the second handler may be a command handler. The identity and/or organization may be authenticated at various stages to ensure isolation between organization s. In some embodiments, the techniques herein may be implemented in a cloud computing environment. For example, organization 114 may be a tenant in a cloud computing platform and the first and second handlers may be virtual computing services in a cloud computing platform. As one example, the first handler may be a domain-specific handler and the second handler may be a database-specific handler. Additional aspects of these processes for managing query and write commands are described in further detail below.

Figure 3:
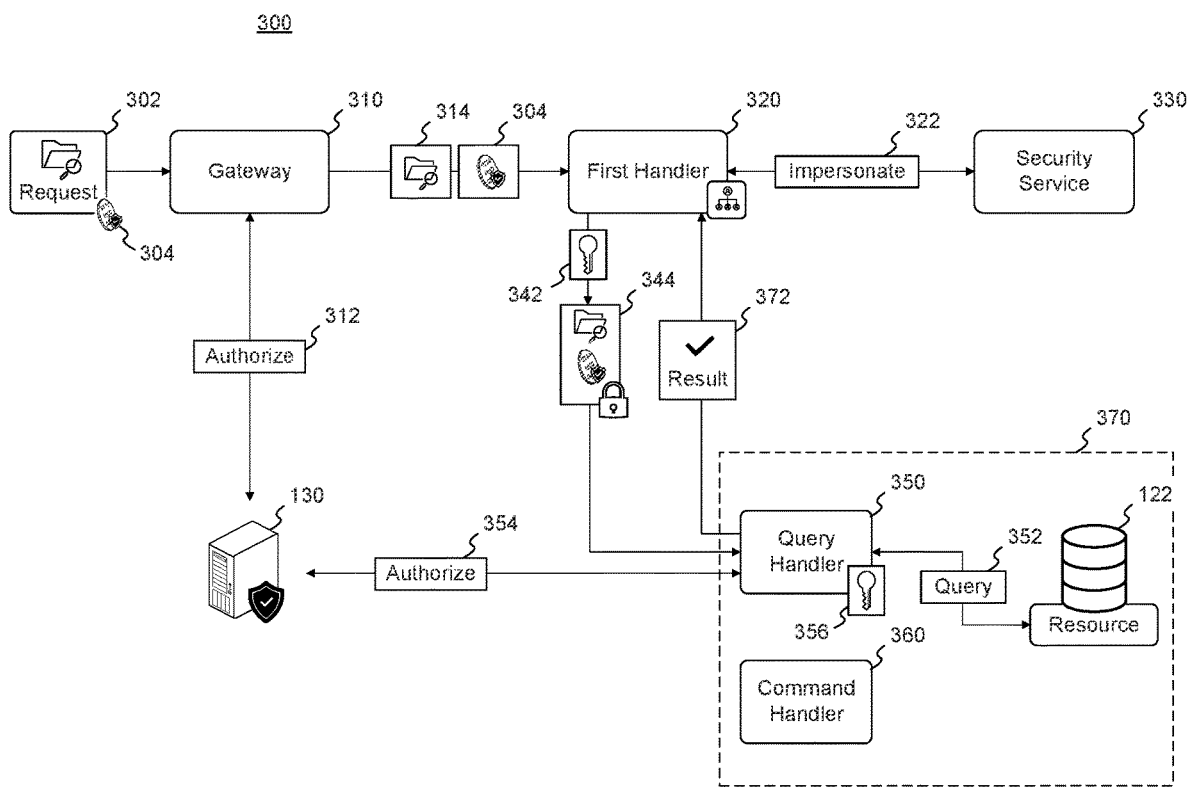
FIG. 3 is a block diagram illustrating an example process for performing a query action on a resource, consistent with the disclosed embodiments.

FIG. 3 is a block diagram illustrating an example process 300 for performing a query action on a resource, consistent with the disclosed embodiments. In some embodiments, process 300 may include receiving a request by an entity to perform a privileged action on a resource. For example, as shown in FIG. 3, target resource 120 may receive a request 302 to perform a privileged action on database 122. In this example, request 302 may be a query for accessing data stored in database 122. For example, request 302 may be received from computing device 110 when identity 122 attempts to read data stored in database 122. In some embodiments, request 302 may be received at a gateway 310, as shown. Gateway 310 may include any form of interface component for receiving privileged data operation requests. In some embodiments, gateway 310 may be associated with an application programming interface (API). Accordingly, request 302 may conform to a specified API for communicating with target resource 120.

In some embodiments, process 300 may include an authorization step 312. As shown in FIG. 3, request 302 may further include a token 304, which may be used to validate request 302. For example, token 304 may be associated with identity 112 and may be validated using privilege management server 130. In some embodiments, this may include providing token 304 (or information identifying token 304) to privilege management server 130, which may validate identity 112 and authorize access to database 122.

Based on a validation of token 304 by privilege management server 130, gateway 310 may trigger operations performed by a first handler 320. In some embodiments, this may include providing an indication of request 302 to first handler 320. The indication of the request may include an indication 314 of the privileged action to be performed along with token 304. First handler 320 may be implemented in various ways. In some embodiments, first handler 320 may be implemented as a cloud function, such as an Amazon Web Services™ (AWS) lambda, and may be a domain-specific cloud function. Various other forms of first handler 320 may be implemented, which may depend on the particular architecture of target resource 120 and/or system 100.

In some embodiments, process 300 may include a step 322 in which first handler 320 impersonates organization 114. Accordingly, first handler 320 may be enabled to perform some or all of the query operations that organization 114 is able to perform. In some embodiments, first handler 320 may impersonate organization 114 using token 304 from request 302. For example, as shown in FIG. 3, first handler 320 may assert token 304 to a security service 330 to authenticate itself for handling request 302. In some embodiments, impersonating organization 114 may include associating first handler 320 with a policy enabling the interaction with a second handler. Conversely, in some embodiments, the second handler may be associated with a policy authorizing the interaction with the first handler 320. For example, the policy may include a list of known identities that are allowed to interact with the second handler.

Security service 330 may be any form of service configured to authorize access based on token 304. In some embodiments, security service 330 may be the same as or associated with privilege management server 130. Alternatively or additionally, security service 330 may be a separate service. As a result of step 322, first handler 320 may be authorized as the requester organization for handling request 302.

Rather than executing request 302 directly on database 122, first handler 320 may be configured to interact with a second handler for performing the request. Accordingly, process 300 may further include providing a second indication of the request to the second handler. As described above, the second handler may include a query handler 350 and a command handler 360, as shown. In some embodiments, query handler 350 and command handler 360 may be implemented within a database abstraction layer (DAL) 370, as shown. First handler 320 may invoke the proper second handler depending on the type of request, thus providing a pattern that separates read and update operations for database 122. In this example, because request 302 is a query request, first handler 320 may invoke query handler 350.

Various information associated with request 302 may be provided to query handler 350. For example, the second indication of the request provided to the second handler may include one or more of an indication of a domain associated with first provider 320, information about request 302, and token 304. The second indication of the request provided to the second handler may include one or more of an indication of a domain associated with first provider. In some embodiments, the second indication of the request may include the name of the domain, a name of the query and a payload of the query. The payload may refer to a set of instructions or other of information indicating the query to be performed on database 122. For example, the payload may be presented in a JavaScript Object Notation (JSON) format or various other suitable formats. In some embodiments, process 300 may further include preparing the payload by first handler 320 to invoke query handler 350. Additional details regarding generating a payload are described below with respect to FIG. 5.

According to some embodiments, first handler 320 may further encrypt the payload to improve security within process 300. For example, organization 114 may be associated with a first key 342 (which may be a public key) and a second key 356 (which may be a private key). First handler 320 may have access to first key 342 dependent on an impersonation process. and may encrypt the payload to generate encrypted payload 344, as shown in FIG. 3. In some embodiments, this may further include encrypting token 304.

Query handler 350 may be configured to open a connection to database 122 (or use an existing connection). In some embodiments, the connection may be opened with read permissions only. In some embodiments, this may include retrieving an identifier of organization 114 from token 304 to select a database associated with organization 114. In some embodiments, process 300 may further include a step 354 in which query handler 350 validates token 304, similar to step 312. Accordingly, if both steps 312 and 354 are performed, token 304 may be validated twice—once at gateway 301 and once when request 302 reaches data abstraction layer 360—thereby increasing security and ensuring that tenant isolation is enforced when accessing database 122. In embodiments where the payload or other data is encrypted by first handler 320, query handler 350 may decrypt encrypted payload 344 using second key 356.

As shown in FIG. 3, query handler 350 may run query 352 (as specified in the payload) on database 122. Query handler may return a result 372 to first handler 320. In this example, result 372 may be the information from database 122 that was requested in request 302. An indication of result 372 may then be provided to identity 112 via computing device 120 in response to request 302.

Figure 4:
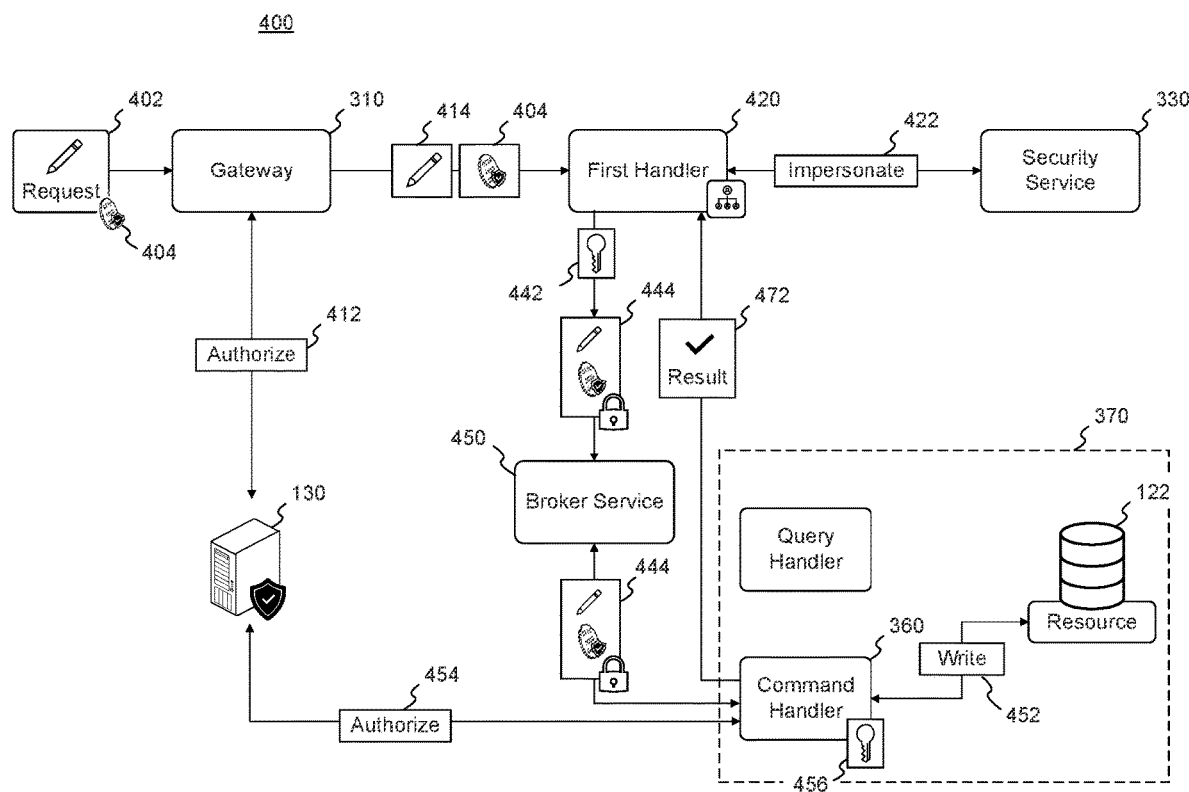
FIG. 4 is a block diagram illustrating an example process for performing a write command action on a resource, consistent with the disclosed embodiments.

To perform privileged actions in the form of write commands, a similar process to process 400 may be performed through command handler 360. FIG. 4 is a block diagram illustrating an example process 400 for performing a write command action on a resource, consistent with the disclosed embodiments. As with process 300, process 400 may include receiving a request by an entity to perform a privileged action on a resource. In this example, request 402 may be a write command for modifying data stored in database 122. For example, request 402 may be received from computing device 110 when identity 122 attempts to modify data stored in database 122. Similar to request 302, request 402 may be received at a gateway 310, as shown. As described above, in some embodiments, gateway 310 may be associated with an API and thus request 402 may conform to a specified API for communicating with target resource 120.

According to some embodiments, process 400 may include an authorization step 412. As shown in FIG. 4, request 402 may further include a token 404, which may be used to validate request 402. For example, token 404 may be associated with identity 112 and may be validated using privilege management server 130. In some embodiments, step 412 may include providing token 404 (or information identifying token 404) to privilege management server 130, which may validate identity 112 and authorize access to database 122.

Based on a validation of token 404 by privilege management server 130 in step 412, gateway 310 may trigger operations performed by first handler 420. In some embodiments, this may include providing an indication of request 402 to first handler 420. The indication of the request may include an indication 414 of the privileged action to be performed along with token 404. In some embodiments, first handler 420 may be the same as first handler 320. For example, first handler 320 may be configured to handle both read and write requests from gateway 310. Alternatively or additionally, first handler 420 may be separate from first handler 320. For example, first handler 320 may be configured to handle read requests (e.g., queries) and first handler 420 may be configured to handle write commands. Accordingly, gateway 310 may route requests to either first handler 320 or first handler 420 depending on a type of the request. As described above with respect to first handler 320, first handler 420 may be implemented as a Python™ lambda function.

In some embodiments, process 400 may include a step 422 in which first handler 420 impersonates organization 114, similar to step 322 described above. Accordingly, first handler 420 may be enabled to perform any write command operations that organization 114 is able to perform. In some embodiments, first handler 420 may impersonate organization 114 using token 404 from request 402. For example, as shown in FIG. 4, first handler 420 may assert token 404 to security service 330 to authenticate itself for handling request 402, as described above with respect to step 322. As a result of step 422, first handler 420 may be authorized as the requester organization for handling request 402. In some embodiments impersonating organization 114 may include associating first handler 420 with a policy enabling the interaction with a second handler. Conversely, in some embodiments, the second handler may be associated with a policy authorizing the interaction with the first handler 420. For example, the policy may include a list of known identities that are allowed to interact with the second handler.

As described above, first handler 420 may be configured to interact with a second handler for performing the request. Accordingly, process 400 may further include providing a second indication of the request to the second handler. In this example, because request 402 is a write command, first handler 420 may invoke command handler 360.

As described above, the second indication of the request provided to the second handler may include one or more of an indication of a domain associated with first provider 420, information about request 402, and token 404. In some embodiments, process 400 may further include preparing a payload by first handler 420 to invoke command handler 360. Additional details regarding generating a payload are described below with respect to FIG. 5. Further, as described above with respect to process 300, first handler 420 may further encrypt the payload to improve security within process 400. For example, organization 114 may be associated with a first key 442 (which may be a public key) and a second key 456 (which may be a private key). First handler 420 may have access to first key 442, dependent on an impersonation process, and may encrypt the payload to generate encrypted payload 444, as shown in FIG. 4. In some embodiments, this may further include encrypting token 404. In some embodiments, first key 422 and second key 456 may be the same as first key 342 and second key 356, respectively. In other words, the same encryption key pair may be used for both queries and write commands. Alternatively or additionally, separate encryption key pairs may be used.

In some embodiments, process 400 may further include a broker service 450 for queuing messages to command handler 360, which may improve the capability of asynchronous processing at command handler 360. For example, broker service 450 may include an Amazon™ Simple Queue Service (SQS), Amazon™ Simple Notification Service (SNS) or similar broker services. Rather than providing the second indication of the request directly to command handler 360, first handler 420 may add a message to a queue maintained by broker service 450. Command handler 360 may be configured to access the queued message to perform the privileged action. In some embodiments, this may include polling broker service 450. Alternatively or additionally, messages may be pushed to command handler 360 by broker service 450.

In some embodiments broker service 450 may provide, among other benefits, an additional layer of security within process 400. For example, broker service 450 may be limited to a particular organization. Accordingly, only organization 114 may be authorized to add messages to broker service 450. Therefore, first handler 420 may be authorized to add messages to a queue of broker service 450 by virtue of impersonating organization 114. Similarly, organization 114 may be authorized to consume messages from broker service 450, whereas other command handlers not associated with organization 114 (i.e., associated with other organizations) may not be authorized to consume messages from broker service 450.

Command handler 360 may be configured to open a connection to database 122 (or use an existing connection). In some embodiments, the connection may be opened with read and write permissions only. In some embodiments, this may include retrieving an identifier of organization 114 from token 404 to select a database associated with organization 114. In some embodiments, process 400 may further include a step 454 in which command handler 360 validates token 404, similar to step 412, which may increase security and ensure tenant isolation is enforced when accessing database 122, by preserving organization 114 context in a distributed process environment. In embodiments where the payload or other data is encrypted by first handler 420, command handler 360 may decrypt encrypted payload 444 using second key 456.

As shown in FIG. 4, command handler 360 may run write command 452 (as specified in the payload) on database 122. Command handler 360 may return a result 472 to first handler 420. In this example, result 472 may be a confirmation that a write command (e.g., writing data, erasing data, modifying data, etc.) specified in request 402 was performed on database 122. An indication of result 472 may then be provided to identity 112 via computing device 120 in response to request 402.

Figure 5:
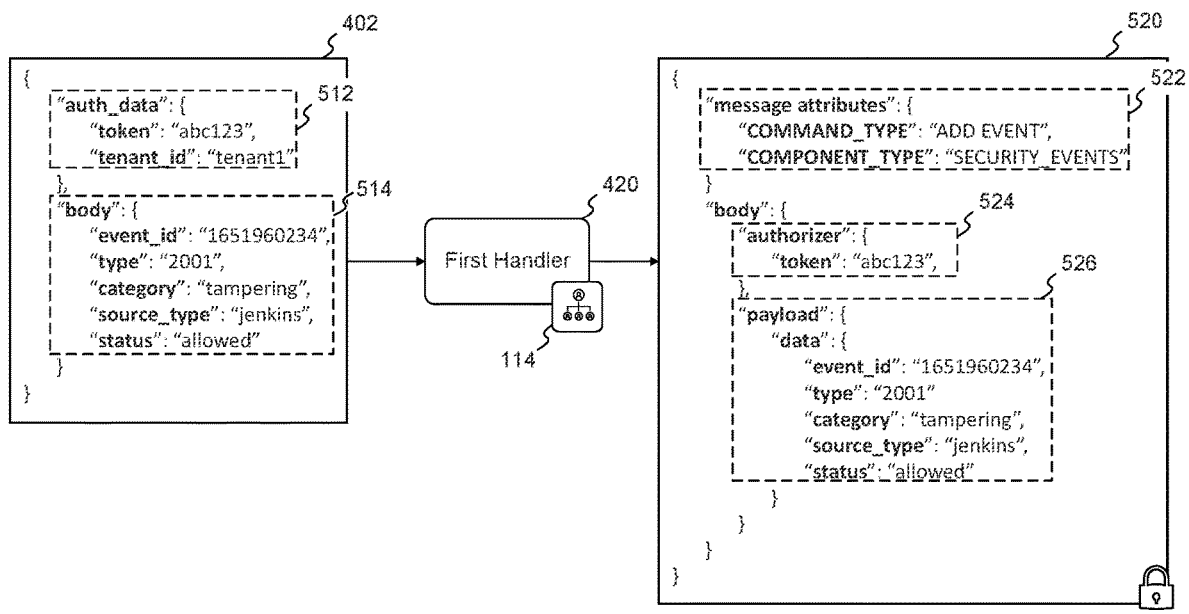
FIG. 5 illustrates an example process for generating a data object indicating a request for invoking a second handler, consistent with the disclosed embodiments.

As described above, processes 300 and 400 may include generating a second indication of a request for invoking a second handler (i.e., query handler 350 and/or command handler 360). In some embodiments, this may include generating a payload and/or other information, as described above. FIG. 5 illustrates an example process 500 for generating a data object indicating a request for invoking a second handler, consistent with the disclosed embodiments. As described above with respect to process 400, first handler 420 may receive a request 402, which in this example may be a write command. For example, request 402 may include authorization data 512 (which may represent token 404) and a body 514, which may indicate the requested privileged action. First handler 420 (having impersonated organization 114) may generate data object 520 based on request 402, which may indicate request 402. For example, data object 524 may include authorizer information 524 (which may indicate token 404) and payload information 526 (which may be generated based on body 514).

In some embodiments, data object 520 may further include various request metadata 522 which may be generated by first handler 420 to characterize request 402. For example, request metadata 522 may specify a type of command to be performed and a type of component the command is to be performed on. In some embodiments, command handler 360 (and/or query handler 350) may execute a request using one or more operations handlers and component operations handlers, which may be configured to perform specific tasks in database 122. The second handler (i.e., query handler 350 and/or command handler 360) may obtain the operations handlers and component operations handlers based on request metadata 522.

Because request 402 is a write command, in some embodiments, data object 520 may be provided to broker service 450. Accordingly, data object 520 may be added as a message to a queue of broker service 450. In some embodiments, data from some or all of object 520 may further be encrypted prior to providing it to broker service 450. For example, data object 520 may be encrypted using first key 422, as described above.

Figure 6:
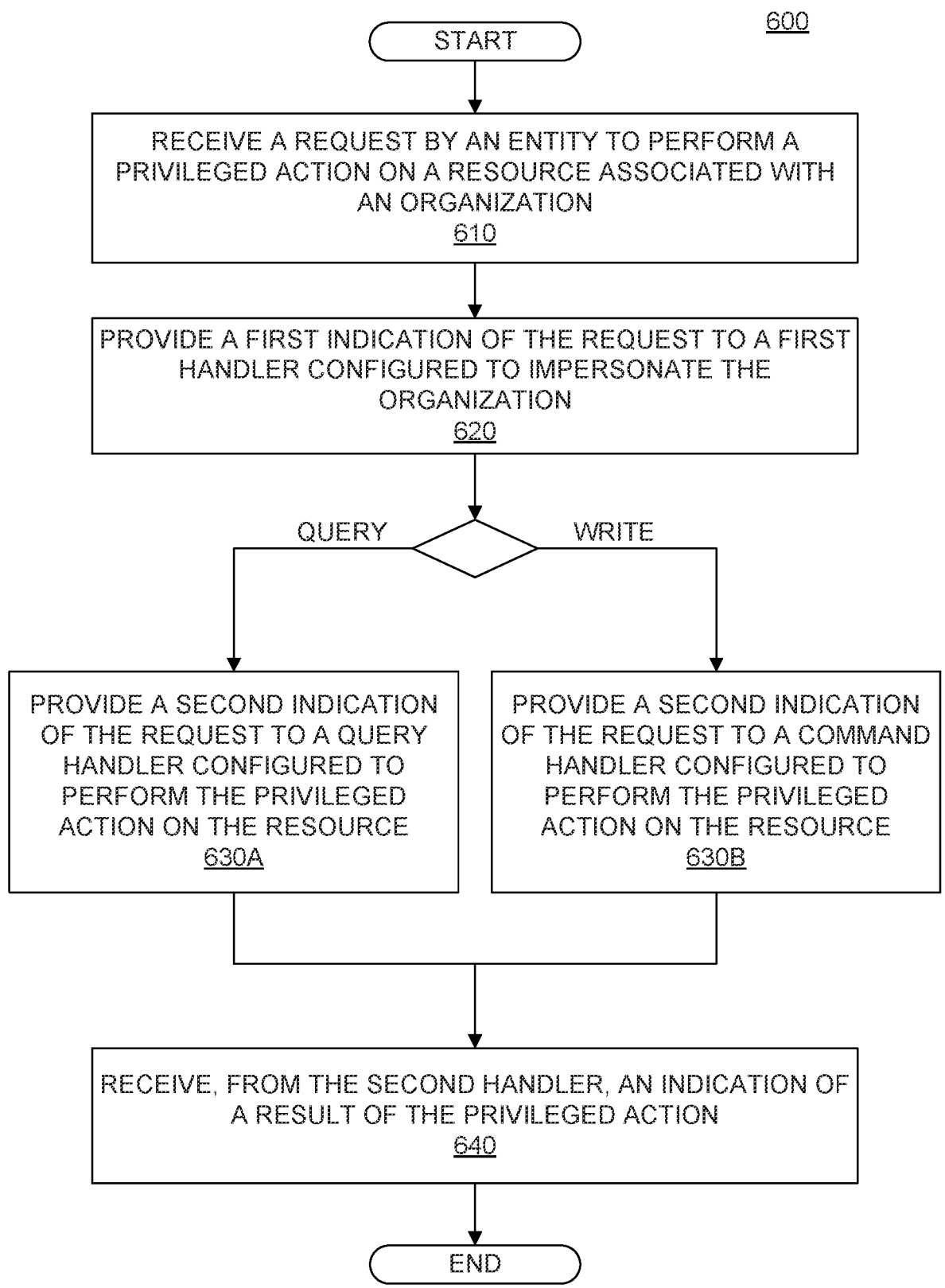
FIG. 6 is a flowchart showing an example process 600 for securely performing actions on a resource, consistent with the disclosed embodiments.

FIG. 6 is a flowchart showing an example process 600 for securely performing actions on a resource, consistent with the disclosed embodiments. Process 600 may be performed by at least one processor of a computing device, such as processor 250, as described above. It is to be understood that throughout the present disclosure, the term "processor" is used as a shorthand for "at least one processor." In other words, a processor may include one or more structures that perform logic operations whether such structures are collocated, connected, or dispersed. In some embodiments, a non-transitory computer readable medium may contain instructions that when executed by a processor cause the processor to perform process 600. Further, process 600 is not necessarily limited to the steps shown in FIG. 6, and any steps or processes of the various embodiments described throughout the present disclosure may also be included in process 600, including those described above with respect to, for example, FIGS. 3, 4, and 5.

In step 610, process 600 may include receiving a request by an entity to perform a privileged action on a resource. As described above, the privileged action may include either a query or a write command. For example, this may include receiving request 302 and/or 402 from identity 112. In some embodiments, the resource may be associated with an organization. Accordingly, the entity may similarly be associated with the organization. In some embodiments, the request may include a token associated with the entity. For example, this may include token 304 or 404 described above. In some embodiments, the request may be received at a gateway, such as gateway 310. As described above, gateway 310 may include an API gateway. Accordingly, the request may include an API request.

In step 620, process 600 may include providing a first indication of the request to a first handler configured to impersonate the organization. For example, this may include providing an indication of the request to first handler 320 or first handler 420, which may be configured to impersonate organization 114, as described above. The first handler may impersonate the organization in various ways. In some embodiments, the first handler may be configured to impersonate the organization using the token. Accordingly, the first indication of the request may include an indication of the privileged action and the token, as described above. In some embodiments, process 600 may further include validating the token. For example, the token may be validated by privilege management server 130 as described above. Accordingly, the first indication of the request may be provided to the first handler based on the validation.

The first handler may further be configured to interact with a second handler. Accordingly, process 600 may include providing a second indication of the request to the second handler, which may be configured to perform the privileged action on the resource. As described above, the second handler may include a query handler and a command handler. In step 630A, when the privileged action includes a query, process 600 may include providing the second indication of the request to a query handler configured to perform the privileged action on the resource. For example, this may include providing the second indication of the request to query handler 350. In step 630B, when the privileged action includes a write command, process 600 may include providing the second indication of the request to a command handler configured to perform the privileged action on the resource. For example, this may include providing the second indication of the request to command handler 360.

According to some embodiments, impersonating the organization by the first handler may enable the interaction between the first handler and the second handler. For example, impersonating the organization may include associating the first handler with a policy enabling the interaction with the second handler. Alternatively or additionally, the second handler may be associated with a policy controlling (e.g., authorizing) the interaction with the first handler. For example, the policy may include a list of known identities that are allowed to interact with the second handler (which may include organization 114) and the first handler may impersonate organization 114.

In some embodiments, providing the second indication of the request to the second handler may include generating a payload. For example, this may include generating payload information 526 (and/or other portions of data object 520), as described above. Accordingly, the payload may include an indication of the privileged action. In some embodiments, providing the second indication of the request to the second handler may include encrypting the payload using a public key of the entity associated with organization. For example, this may include encrypting the payload using first key 342 or 442, as described above. The second handler may be configured to decrypt the payload using a private key of the entity associated with the organization. For example, this may include decrypting the payload using second key 356 or 456, as described above. In some embodiments, the various encryption keys may be restricted such that they may only be accessed in association with organization 114. For example, the public key may be available to the first handler only after impersonating the organization. Similarly, the private key may be available to the second handler only after validating the token (e.g., in step 354 or 454). Accordingly, performing the privileged action by the second handler may include validating the token. In some embodiments, the second handler may be configured to retrieve the private key of the entity associated with organization 114 using an entity ID associated with the organization. For example, the entity ID may be extracted from the token. Accordingly, the second indication of the request may include the token.

As described above, when the privileged action includes a write command, a broker service 450 may be implemented. Accordingly, providing the second indication of the request to the second handler may include adding a message to a broker service. Further, performing the privileged action by the second handler may include consuming the message from the broker service. In some embodiments, the broker service may be restricted for a particular organization. For example, the first handler may be authorized to add the message to the broker service based on impersonating the organization. Similarly, the second handler may be authorized to consume messages from the broker service by virtue of being associated with the organization. Accordingly, other second handlers not associated with the organization (e.g., an additional second handler associated with a different organization) may be unauthorized to consume messages from the broker service.

In some embodiments, the second handler may be configured to perform the privileged action on the resource using at least one operations handler. The at least one operations handler is selected from a plurality of operations handlers based on the privileged action. For example, this may include selecting the operations handler based on message attributes 522, as described above. In some embodiments, providing the second indication of the request to the second handler may include selecting the operations handler from a plurality of operations handlers, each of the operations handlers being associated with a different second handler.

In step 640, process 600 may include receiving, from the second handler, an indication of a result of the privileged action. For example, when the privileged action includes a query, the indication of the result of the action may include data requested through the query. In some embodiments, step 640 may not necessarily be performed. For example, when the privileged action includes a write command, the information indicated by the write command has been written to the resource without providing a response. Alternatively or additionally, the indication of the result of the action may include a confirmation that information indicated by the write command has been executed in connection with the resource. In some embodiments, the indication of the result may include various other forms of information. For example, the indication of the result may be an error message indicating one or more errors occurred in executing the write command. As another example, the indication of the result may include the target of the write command, either in the original form (before performing the write command), the updated form (after performing the write command), or both. In some embodiments, the indication of the result may be a message including the target (either in original or updated form), or a reference to the target (e.g., a link, an excerpt showing the update, etc.).

In some embodiments, process 600 may be implemented in a cloud computing platform. For example, the organization may be a tenant in a cloud computing platform. Accordingly, the first handler and the second handler (i.e., query handler 350 and command handler 360) may be virtual computing services in a cloud computing platform. For example, the first handler and the second handler may be Python™ lambda functions or other services.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for securely performing actions on a resource, the operations comprising:
   receiving, from an entity associated with an organization, a request by the entity to perform a privileged action on a resource associated with the organization, the privileged action including either a query or write command, the request including a token associated with the entity;
   providing a first indication of the request to a first handler configured to impersonate the entity associated with the organization, wherein the first handler is further configured to interact with a second handler; and
   providing a second indication of the request to the second handler, the second handler being configured to perform the privileged action on the resource, the second handler including a query handler and a command handler, wherein:
   when the privileged action includes a query, the second indication of the request is provided to the query handler and the query handler is configured to provide an indication of a result of the privileged action; and
   when the privileged action includes a write command, the second indication of the request is provided to the command handler.

2. The non-transitory computer readable medium of claim 1, wherein the operations further comprise validating the token, and wherein the first indication of the request is provided to the first handler based on the validation.

3. The non-transitory computer readable medium of claim 1, wherein the first indication of the request includes an indication of the privileged action and the token.

4. The non-transitory computer readable medium of claim 2, wherein the first handler is configured to impersonate the organization using the token.

5. The non-transitory computer readable medium of claim 1, wherein the second indication of the request includes the token and wherein performing the privileged action by the second handler includes validating the token.

6. The non-transitory computer readable medium of claim 1, wherein impersonating the organization enables the interaction between the first handler and the second handler.

7. The non-transitory computer readable medium of claim 6, wherein impersonating the organization includes associating the first handler with a policy enabling the interaction with the second handler.

8. The non-transitory computer readable medium of claim 6, wherein the second handler is associated with a policy controlling the interaction with the first handler.

9. The non-transitory computer readable medium of claim 1, wherein providing the second indication of the request to the second handler includes generating a payload.

10. The non-transitory computer readable medium of claim 9, wherein the payload includes an indication of the privileged action.

11. The non-transitory computer readable medium of claim 1, wherein the organization is a tenant in a cloud computing platform.

12. The non-transitory computer readable medium of claim 1, wherein the first query handler and the second query handler are virtual computing services in a cloud computing platform.

13. The non-transitory computer readable medium of claim 1, wherein the second handler is configured to perform the privileged action on the resource using at least one operations handler.

14. The non-transitory computer readable medium of claim 13, wherein the at least one operations handler is selected from a plurality of operations handlers based on the privileged action.

15. The non-transitory computer readable medium of claim 13, wherein providing the second indication of the request to the second handler includes selecting the operations handler from a plurality of operations handlers, each of the operations handlers being associated with a different second handler.

16. The non-transitory computer readable medium of claim 1, wherein the privileged action includes a write command, and wherein providing the second indication of the request to the second handler includes adding a message to a broker service.

17. The non-transitory computer readable medium of claim 16, wherein the first handler is authorized to add the message to the broker service based on impersonating the organization.

18. The non-transitory computer readable medium of claim 16, wherein performing the privileged action by the second handler includes consuming the message from the broker service.

19. The non-transitory computer readable medium of claim 16, wherein the second handler is authorized to consume messages from the broker service, and wherein an additional second handler not associated with the organization is unauthorized to consume messages from the broker service.

20. A computer-implemented method for securely performing actions on a resource, the method comprising:
   receiving, from an entity associated with an organization, a request by the entity to perform a privileged action on a resource associated with the organization, the privileged action including either a query or a write command, the request including a token associated with the entity;
   providing a first indication of the request to a first handler configured to impersonate the entity associated with the organization, wherein the first handler is further configured to interact with a second handler associated with the resource; and
   providing a second indication of the request to the second handler, the second handler being configured to perform the privileged action on the resource, the second handler including a query handler and a command handler, wherein:
      when the privileged action includes a query, the second indication of the request is provided to the query handler and the query handler is configured to provide an indication of a result of the privileged action; and
      when the privileged action includes a write command, the second indication of the request is provided to the command handler.

21. The computer-implemented method of claim 20, wherein providing the second indication of the request to the second handler includes generating a payload including an indication of the privileged action operation and encrypting the payload using a public key of the entity associated with the organization.

22. The computer-implemented method of claim 21, wherein the public key is available to the first handler only after impersonating the organization.

23. The computer-implemented method of claim 21, wherein the second handler is configured to decrypt the payload using a private key of the entity associated with the organization.

24. The computer-implemented method of claim 23, wherein the private key is available to the second handler only after validating the token.

25. The computer-implemented method of claim 21, wherein the second indication of the request includes the token and wherein the second handler is configured to retrieve the private key of the entity associated with the organization using an entity ID associated with the organization, the entity ID being extracted from the token.

26. The computer-implemented method of claim 20, wherein the request includes an application programming interface (API) request.

27. The computer-implemented method of claim 20, wherein the resource is a database and wherein the first handler is a domain-specific handler and the second handler is a database-specific handler.

28. The computer-implemented method of claim 20, wherein when the privileged action includes a query, the indication of the result of the action includes data requested through the query.

29. The computer-implemented method of claim 20, wherein when the privileged action includes a write command, the command handler is configured to provide a confirmation that information indicated by the write command has been written to the resource.

30. The computer-implemented method of claim 20, wherein when the privileged action includes a write command, the command handler is configured to provide at least one of an error message, an original form of the resource prior to performing the privileged action, an updated form of the resource after performing the privileged action, or a message including at least a portion of the resource.

* * * * *